H. R. EDGECOMB.
DEVICE FOR TESTING PLASTIC MATERIALS.
APPLICATION FILED AUG. 22, 1913.
1,184,837. Patented May 30, 1916.
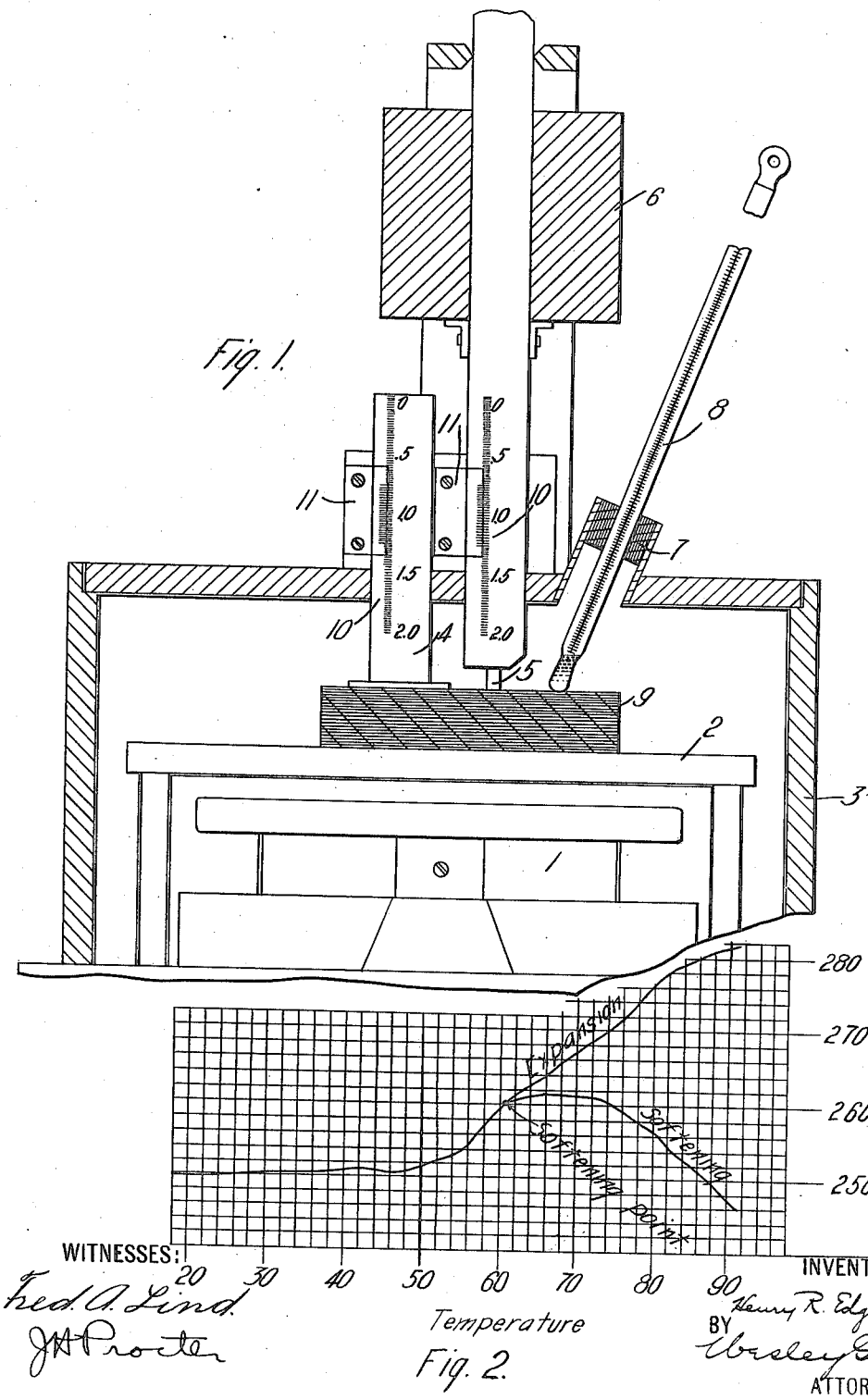

UNITED STATES PATENT OFFICE.

HENRY R. EDGECOMB, OF WILKINSBURG, PENNSYLVANIA, ASSIGNOR TO WESTINGHOUSE ELECTRIC AND MANUFACTURING COMPANY, A CORPORATION OF PENNSYLVANIA.

DEVICE FOR TESTING PLASTIC MATERIALS.

1,184,837.     Specification of Letters Patent.     Patented May 30, 1916.

Application filed August 22, 1913. Serial No. 786,078.

*To all whom it may concern:*

Be it known that I, HENRY R. EDGECOMB, a citizen of the United States, and a resident of Wilkinsburg, in the county of Allegheny and State of Pennsylvania, have invented a new and useful Improvement in Devices for Testing Plastic Materials, of which the following is a specification.

My invention relates to insulation testing devices and particularly to devices for testing plastic substances such as molded insulating material and the like.

The object of my invention is to provide an instrument which will accurately measure the softening point of molded insulating material and other plastic substances.

Numerous devices have been proposed for measuring the softening point of molded insulation that is used in the manufacture of electrical appliances. These devices do not determine the softening point accurately because they rely wholly upon a plunger resting upon the insulation under test to measure the indentation under high temperature. The insulation expands, as well as softens, when heated, and, since there is no definite relation between the degree of expansion of a substance and its softening point, it is apparent that the above mentioned means cannot be safely relied upon for securing accurate results.

In my invention, I take into consideration the expansive property of an insulating material, in determining its softening point, in order to compare the relative softening points of various insulating material, to determine the heat they will stand without damage.

In the accompanying drawings, Figure 1 is a view of an insulation testing device shown partially in section and partially in elevation, and Fig. 2 is a curve showing the relative degrees of expansion and softening of an insulating material at different temperatures.

My invention comprises an electrical heater 1, a plate or slab 2 located above the heater 1, a hood 3 for retaining the heat given off by the heater, a rod 4 having a relatively large lower face, a rod 5 having a relatively small lower face, which is usually about .01 square inches in area, a weight 6 attached to the rod 5, and an opening 7 in hood 3 for a thermometer 8. The rods 4 and 5 and the thermometer 8 rest upon a sample of insulating material 9 to be tested. Each of the rods 4 and 5 has a scale 10 marked upon it. Stationary vernier scales 11 are provided for accurately determining the degrees of movement of the rods 4 and 5.

In order to measure the softening point of an insulating material or other plastic substance a sample 9 is selected having two plane sides. The sample 9 is placed on the plane surface of the slab 2, and the rods 4 and 5, which are slidably mounted in suitable guides are loosely placed upon it. The rod 5 is of such a size and carries such a weight 6 that its pressure on the sample is approximately 200 lbs. per square inch or any other convenient pressure. The hood 3 is placed over the sample and the thermometer 8 inserted therein. The positions of the rods or plungers 4 and 5 are noted for different temperatures, and curves are plotted between temperatures as abscissas and movement or expansion in thousandths of an inch as ordinates. These two curves will be superimposed upon one another through certain temperature ranges as the material expands, then, when the material begins to soften, the rod 5 will begin to change its direction of travel and, instead of moving upwardly, it will embed itself in the sample. Where the two curves begin to diverge from one another is the point at which the material begins to soften and this is called its softening point, shown at 60° by the curve in Fig. 2.

Since structural modifications may be effected within the scope and spirit of my invention, I desire that only such limitations shall be imposed as are indicated in the appended claims.

I claim as my invention:

1. In a device for testing plastic material, the combination with means for heating a sample to be tested, of means for indicating the expansion of the sample at progressively varying temperatures, and other means for indicating the softening point of the sample.

2. In a device for testing plastic material, the combination with means for heating a sample to be tested, of a support for the sample, a movable member adapted to rest upon the sample, means for indicating the degree of movement of said member at progressively varying temperatures, and means for indicating the degree of softening of the sample at the same varying temperatures.

3. In a material-testing device, the combination with means for heating a sample of material to be tested, of a support for the sample having a plane surface, a movable member adapted to rest upon the sample, means for indicating the degree of movement of the said member at progressively varying temperatures, and means for indicating the softening point of the sample.

4. In a testing device, the combination with means for heating a sample of material to be tested, of a support for the sample, means for indicating the degree of expansion of the sample at progressively varying temperatures, and means for indicating the softening point of the sample.

5. In a testing device, the combination with means for heating a sample of material to be tested, of a support for the sample, a movable member adapted to rest upon the upper face of the sample, means for indicating the degree of movement of said member at progressively varying temperatures, and a second member resting upon the surface of the sample for indicating the softening point of the sample.

6. In a testing device, the combination with means for heating a sample of material to be tested, of a support for the sample, a movable member resting upon the upper face of the sample, said member having a relatively large contact area, a scale for indicating the degree of movement of said member at progressively varying temperatures, a second member also resting upon the sample and having a relatively small contact area, means for applying a force to said second member, and means for determining the distance traveled by said second member at the same series of temperatures.

7. In a testing device, the combination with means for heating a sample of material to be tested, of a support for the sample, a movable member resting upon the upper face of the sample, said member having a relatively large contact area, a scale for indicating the degree of movement of said member at progressively varying temperatures, a second member also resting upon the sample and having a relatively small contact area, means for applying a predetermined force to said second member, and a vernier scale for determining the distance traveled by said second member at the same series of temperatures.

8. In a testing device, the combination with means for heating a sample of material to be tested, of a movable member resting upon the upper face of the sample to indicate its lateral expansion, a vernier scale for indicating the degree of such expansion, a second member also resting upon the sample and having a relatively small contact area, means for applying a predetermined weight to said second member, and a vernier scale for determining the degree of indentation made by said second member at progressively varying temperatures.

In testimony whereof, I have hereunto subscribed my name this 14th day of August, 1913.

HENRY R. EDGECOMB.

Witnesses:
GOLDIE E. McGEE,
B. B. HINES.